United States Patent [19]

Geyer et al.

[11] Patent Number: 5,142,530
[45] Date of Patent: * Aug. 25, 1992

[54] MULTI-FRAME STRIPPING PROTOCOL FOR TOKEN RING NETWORKS

[75] Inventors: Joel E. Geyer, Cary; Joseph K. Lee, Raleigh; Vernon R. Norman, Cary; Kenneth T. Wilson, Raleigh, all of N.C.

[73] Assignee: International Business Machines Corporation, Armonk, N.Y.

[*] Notice: The portion of the term of this patent subsequent to Jun. 5, 2007 has been disclaimed.

[21] Appl. No.: 422,168

[22] Filed: Oct. 16, 1989

[51] Int. Cl.⁵ .............................................. H04J 3/02
[52] U.S. Cl. .................................. 370/85.5; 370/85.1
[58] Field of Search ............... 370/85.4, 85.5, 85.15, 370/94.1, 85.1; 371/55, 14

[56] References Cited

U.S. PATENT DOCUMENTS

| | | | |
|---|---|---|---|
| 4,811,361 | 3/1989 | Bacou et al. | 371/55 |
| 4,922,244 | 5/1990 | Hullett et al. | 370/85.1 |
| 4,932,023 | 6/1990 | Geyer et al. | 370/85.4 |
| 4,932,032 | 6/1990 | Geyer et al. | 370/85.4 |
| 4,964,113 | 10/1990 | Geyer et al. | 370/85.5 |

FOREIGN PATENT DOCUMENTS

| | | |
|---|---|---|
| 0095389 | 5/1983 | European Pat. Off. |
| 328004 | 8/1989 | European Pat. Off. |
| 354809 | 2/1990 | European Pat. Off. |
| 3507582 | 9/1986 | Fed. Rep. of Germany |

Primary Examiner—Douglas W. Olms
Assistant Examiner—Shick Hom
Attorney, Agent, or Firm—John J. Timar

[57] ABSTRACT

A multi-frame stripping method for use in a token ring network utilizing early token release with multiple frames transmitted by multiple stations circulating around the ring. The method recovers the ring with minimum loss of data after detection of an error condition resulting in frame corruption. The transmitting station is responsible for removing its own frames from the ring. With one or more of its frames corrupted, a station terminates frame removal after the transmitter has finished transmitting when a frame is received from another station without code violation errors in the frame header if the frame counter has returned to its initial value. The station terminates stripping when only a single frame is transmitted and then becomes corrupted if an isolated ending delimiter is detected at the station. The station also terminates stripping in the multi-frame case when the ending delimiter of the last frame transmitted by the source station is received without code violation error in the I-bit, if each preceding ending delimiter is correctly detected regardless of data corruption occurring in any frame header. The method is applicable to the IEEE 802.5 and ANSI X3T9.5 (FDDI) standards.

25 Claims, 10 Drawing Sheets

(A) LARGE RING:

NOTE: (← = SD, → = ED, ✱ = SOURCE ADDRESS)

(B) MEDIUM RING:

(C) SMALL RING:

(A) LARGE RING:

NOTE: (← = SD. → = ED. * = SOURCE ADDRESS)

(B) MEDIUM RING:

(C) SMALL RING:

(A) LARGE RING:

NOTE: (← = SD, ⊣ = ED, ∗ = SOURCE ADDRESS)

(B) MEDIUM RING:

(C) SMALL RING:

(A) LARGE RING:

NOTE: (← = SD, ⊣ = ED, * = SOURCE ADDRESS)

(B) MEDIUM RING:

(C) SMALL RING:

(A) STATION-A ACTIVITIES:

(B) STATION-B ACTIVITIES:

(C) STATION-C ACTIVITIES:

NOTE: (← = SD, ⊣ = ED, * = SOURCE ADDRESS)

MULTI-FRAME STRIPPING PROTOCOL FOR TOKEN RING NETWORKS

REFERENCE TO RELATED APPLICATION

This application is related to patent application, Ser. No. 368,739 filed on Jun. 20, 1989 now U.S. Pat. No. 4,932,023 and entitled, "Frame Stripping Protocol for Early Token Release in a Ring Communication Network." The related patent application has the same assignee and the same inventorship as this application. The related application discloses a frame stripping algorithm for a token ring network using early token release. It addresses the problem of data corruption on a token ring network wherein each transmitting station places a single frame on the ring before releasing the token.

BACKGROUND OF THE INVENTION

The invention relates to communication networks in general and more particularly to a protocol for stripping data from a token ring network using both early token release and a multi-frame transmit mode.

The above-referenced related application discusses the concepts of normal and early token release and is incorporated herein by reference. In early token release, a transmitting station can release the token as soon as it completes frame transmission, thus making the token available to other stations waiting to transmit sooner than in normal token release. The co-pending application addresses the situation where a station on the ring transmits a token immediately after sending one frame of data. Although multiple frames can be on the ring simultaneously, only one frame can be placed on the ring by a given station. The disclosed method for removing corrupted messages involves a check for two conditions and the occurrence of either terminates frame stripping at a receiving station. In the first test, the receiving station compares the source address of the received frame against the source address of the frame that is transmitted. If they do not match and no code violation errors are detected within the frame header, the receiving station stops its stripping operation immediately. The second condition disclosed for terminating the stripping operation of a receiving station is the detection of an isolated ending delimiter, i.e., an ending delimiter that was not preceded by a paired starting delimiter.

In certain special application token ring networks, there is a requirement to have a single station transmit multiple frames onto the ring before releasing the token to enable other stations to transmit. Typical situations are an air traffic control network or the flight arrival and departure network at airports where there is a requirement for real-time updates and the transmissions are numerous, short and bursty in nature. Rapid recovery of the token ring network in these environments is critical. However, the disclosed process in the related application for recognizing corrupted frames and terminating the strip operation will not be effective in a multi-frame transmit situation (multiple frames being transmitted by one station). Furthermore, neither the IEEE 802.5 protocol standard for token rings nor the proposed American National Standards Institute (ANSI) standard X3T9.5 for Fiber Distributed Data Interface (FDDI) address the problems solved by this invention.

SUMMARY OF THE INVENTION

It is therefore an object of this invention to provide a multi-frame stripping protocol for token ring networks that is applicable to both single frame and multi-frame transmission and to both normal token release and early token release.

It is another object of this invention to provide a frame stripping protocol that can recover a token ring network from any strip error conditions with a minimum loss of data on the ring.

It is a further object of this invention to provide a frame stripping protocol that is applicable to both the IEEE 802.5 (Token Ring) and the ANSI X3T9.5 (FDDI) standards.

It is a still further object of this invention to provide a hardware and software implementation of the frame stripping protocol that can be integrated into existing firmware easily.

These and other objects are accomplished by the present invention by monitoring both a frame counter in the station's transmitter and the "intermediate frame bit" in the ending delimiter of received frames. The intermediate frame bit is also referred to as the "I-bit" and follows the unique bit pattern occurring in the first six bits of the ending delimiter. A one in the I-bit indicates that the frame is an intermediate frame; a zero, that the frame is the last frame in the transmit sequence. The data pattern of the ending delimiter and the position of the I-bit is shown in FIG. 1. The frame counter is selectively incremented when a frame is transmitted and selectively decremented when a frame is stripped.

In a token ring network, a transmit station can send frames using either a single frame mode or a multi-frame mode. In a single frame mode, a station can send only one frame per usable token. In a multi-frame mode, a station can send multiple frames per usable token. The maximum number of frames that the station can transmit is limited by the Token Holding Timer (THT) which is specified in the applicable standard.

In a token ring network, a transmit station is responsible for removing the frames from the ring that it has originated. This process is relatively simple in single frame mode ring using normal token release (NTR). The task becomes more complex for a token ring using early token release (ETR), particularly so when operating in a multi-frame mode. In the latter case, a transmit station has to keep track of the number of frames it has sent, so that it can strip exactly the same number of return frames during the stripping process. In addition, the transmit station has to perform other multi-frame mode administrative tasks like setting the I-bit in the ending delimiter of an intermediate frame.

The multi-frame stripping protocol of this invention is performed by three finite state machines implemented in hardware. The state machines provide for termination of frame stripping operations at a source station if one or more of its transmitted frames have been corrupted when special unique combinations of conditions are detected. A first unique combination occurs after the transmitter has finished transmitting when the source address of a frame from another station is detected without code violation errors in the frame header and the value in the frame counter has returned to its initial value. A second unique combination occurs when an isolated ending delimiter is detected in the only frame placed on the ring at the transmitting station. A third unique combination occurs when the ending delimiter of the last frame transmitted by the source station has been received without code violation error in the I-bit, if the ending delimiter of each previously transmitted frame has been detected despite corruption in the frame header of one or more frames.

The foregoing features and advantages of the invention will be more fully described in the accompanying drawings.

DESCRIPTION OF THE PREFERRED EMBODIMENT

Figure 1:
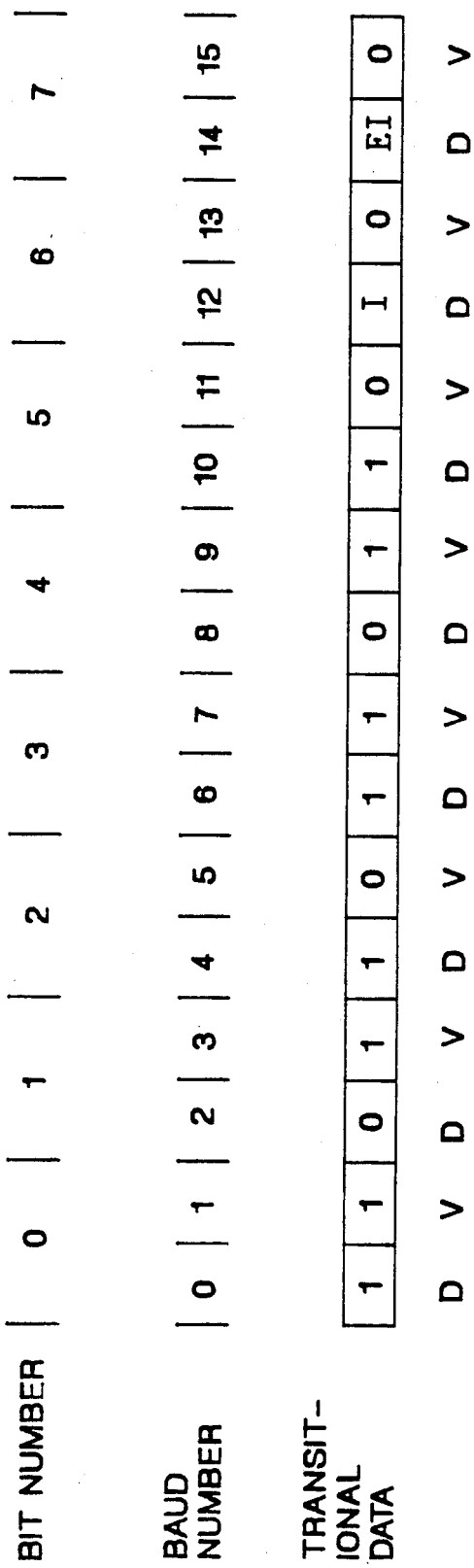
FIG. 1 illustrates the data pattern of the ending delimiter.
Figure 2:
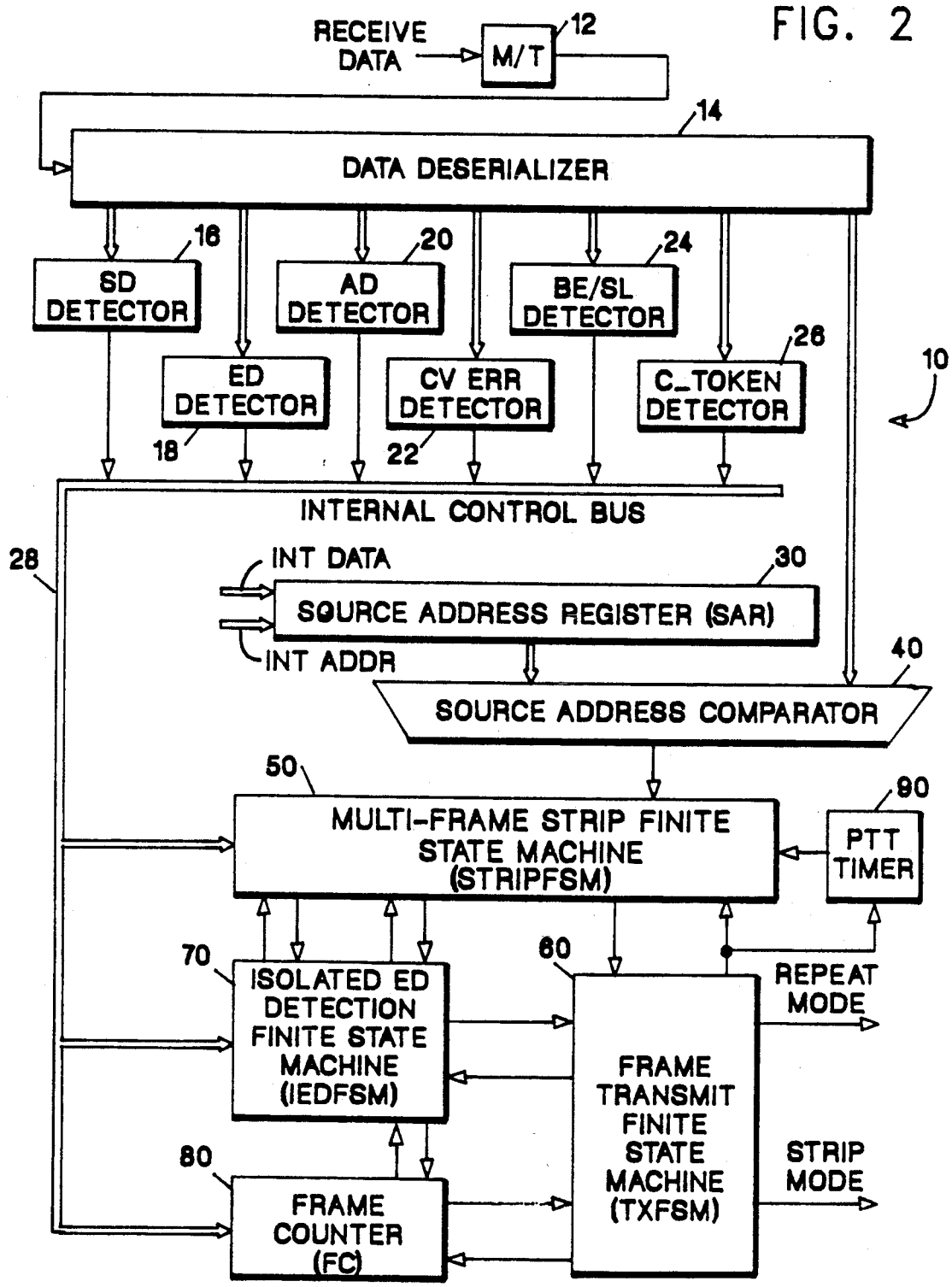
FIG. 2 illustrates a block diagram implementation of the multi-frame stripping mechanism of this invention.

The hardware implementation of the multi-frame stripping protocol is shown in block diagram form in FIG. 2. Incoming ring data is first converted from Differential Manchester Code to Transitional Code by the Manchester-to-Transitional decoder (M/T) 12. The decoded serial ring data is shifted into a 16-bit data deserializer 14 which deserializers the serial data stream into a parallel data stream. The parallel data of the data deserializer 14 is loaded into the source address comparator 40 at the necessary time to do the source address (SA) comparison. In this process, the contents of the source address register (SAR) 30 is compared against the incoming frame source address (SA). The contents of the SAR 30 are updated by the adapter microcode during each transmit frame through an internal data and address bus 32. Also tapping at the parallel output of data deserializer 14 are different hardware detectors 16, 18, 20, 22, 24, 26 which are needed to detect the different delimiters and error conditions required by the three finite state machines (FSM) 50, 60, 70. All the detector outputs are connected to the FSM through an internal control bus 28.

The function of the SD detector 16 is to decode the starting delimiter pattern specified in the applicable standard (IEEE 802.5 or ANSI X3T9.5). The function of the ED detector 18 is to decode the ending delimiter pattern specified in the applicable standard. The function of the AD detector 20 is to decode an abort delimiter. In the IEEE 806.5 standard, an abort delimiter is defined as a starting delimiter immediately followed by an ending delimiter.

The function of the CV detector 22 is to detect code violation errors in each byte of received data. In the transitional data format, a one in any of the eight code violation bauds in a byte is decoded as a code violation error. In differential Manchester format, a code violation is defined as a bit without a transition in the middle (i.e., the half bit time).

The function of the BE/SL detector 24 is to detect burst errors and signal loss errors. In the IEEE 802.5 standard, a burst error is defined as four or more consecutive Manchester bits without a transition occurring. In transitional data format, three or more consecutive bauds equal to one is decoded as a burst error. A signal loss error is caused by either a receive clock frequency error which may result in data being sampled incorrectly or the elastic buffer overflow error.

The function of the C_TOKEN detector 26 is to detect a corrupted token pattern. In the IEEE 802.5 standard, a normal token is defined as a starting delimiter pattern, followed by an access control byte and an ending delimiter pattern. A corrupted token is one in which the ending delimiter pattern of the token has been corrupted.

The strip protocol is performed by the multi-frame transmit finite state machine (TXFSM) 60, the multi-frame stripping finite state machine (STRIPFSM) 50, and the multi-frame stripping isolated ending delimiter detection finite state machine (IEDFSM) 70 working closely in concert with the frame counter (FC) 80 and the physical trailer timer (PTT) 90. The PTT timer 90 serves as a maximum time limiter for the stripping process. It is started by the TFXSM 60 at the beginning of the strip process. If, after a predetermined period of time, a station is still in strip mode, the PTT timer 90 will signal the strip FSM 50 to terminate the strip process. The frame counter 80 is used by the TXFSM 60 and the STRIPFSM 50 to keep track of the number of transmitted frames so that the same number of returning frames will be stripped. All three finite state machines of this invention are implemented in hardware.

Figure 3:
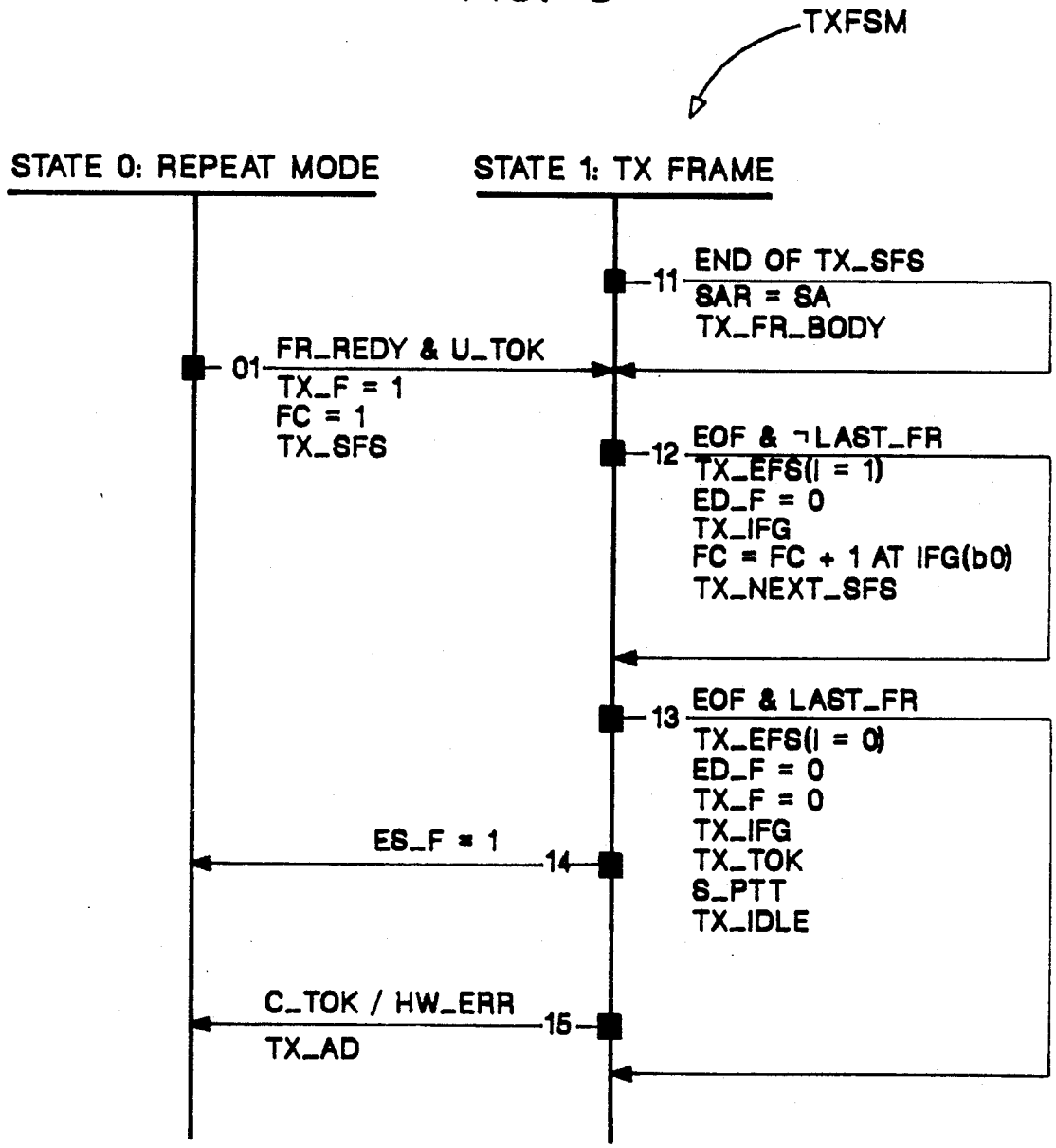
FIG. 3 illustrates the concept of a multi-frame transmit finite state machine (TXFSM).

FIG. 3 illustrates a state transition diagram for the transmit finite state machine (TXFSM) of a multi-frame mode station. The two states shown are state 0-REPEAT MODE and state 1-TX FRAME. This figure, and subsequent figures depicting finite state machine representations, use the same finite state machine notation contained in the IEEE project 802 local networks standard. States are shown as vertical lines. Transitions are shown as horizontal lines with a number used to indicate the transition and an arrow indicating the transition direction. The inputs or conditions causing the transition are shown above the transition line; outputs or actions are shown below the transition line.

The only transition while in REPEAT MODE state is transition 01 to state 1, the TX FRAME state. This transition occurs when the station has a frame ready to transmit (FR_REDY) and it acquires a usable token (U_TOK). The actions taken on the transition are to set the transmit flag (TX_F) and the frame counter (FC) to one. The station transmits the start frame sequence (SFS). The SFS is also referred to as the frame header. The SFS consists of the start delimiter (SD), the access control (AC) field, the frame control field, the destination address (DA), and the source address (SA). The end frame sequence (EFS) to be referred to subsequently, consists of the cyclic redundancy code (CRC), the ending delimiter (ED), and the frame status (FS) byte.

There are five possible transitions while in state 1, three of which cause an exit from and a return to the same state. The other two transitions cause a return to state 0, the repeat mode. Transition 11 occurs at the end of transmission of the start frame sequence. The TXFSM exits from state 1 and returns to the same state. This transition signals the transmitter to capture the source address from the transmitted frame and store it in the source address register while the frame information field is transmitted.

Transitions 12 and 13 are exits from and back to state 1 which serve as time markers to set the I-bit in the ending delimiter. Transition 12 occurs when the transmission reaches the last byte (EOF) of the information field of an intermediate frame. As a result, the I-bit in the ending delimiter is set to 1, the end frame sequence (EFS) is transmitted, the ending delimiter flag (ED_F) is set to 0, and the frame counter (FC) is incremented by 1 at the start of the inter-frame gap (IFG). This latter time is also referred to as the "bit-0" time of the IFG. The next start frame sequence (SFS) is also transmitted. Transition 13 occurs when the transmission reaches the last byte (EOF) of the information field of the last frame. The actions taken are to set the I-bit to 0 and to transmit the end frame sequence, set the ending delimiter flag and the transmit flag to 0, transmit the inter-frame gap, transmit the token, start the PTT timer and transmit idle patterns.

In transition 14, the TXFSM exits from state 1 and returns to the repeat mode (state 0) when the multiframe stripping finite state machine (STRIPFSM) to be discussed below, sets the end strip flag (ES_F) to 1 indicating that the frame stripping process has been completed. No action is needed on the transition. Transition 15 also causes a transition from state 1 (TX FRAME) back to state 0 (REPEAT MODE). The transition occurs when the station detects a corrupted token (C_TOK) or a hardware error (HW_ERR).

Figure 4:
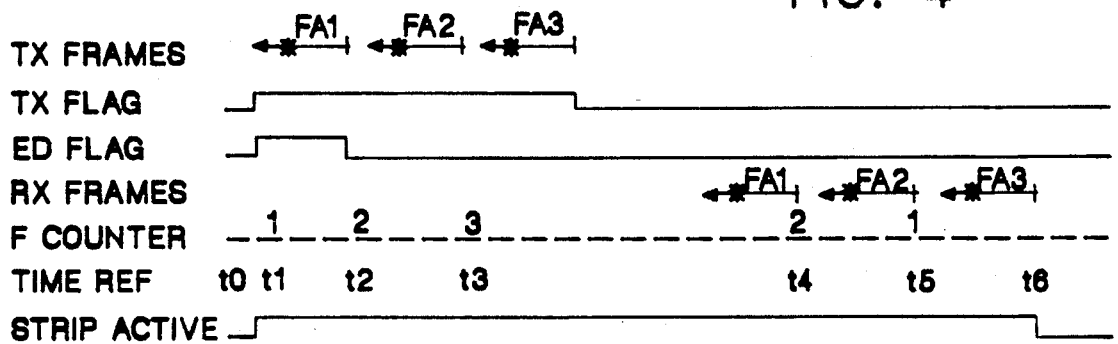
FIGS. 4A-4C illustrate several multi-frame stripping scenarios under normal strip conditions.
Figure 4:
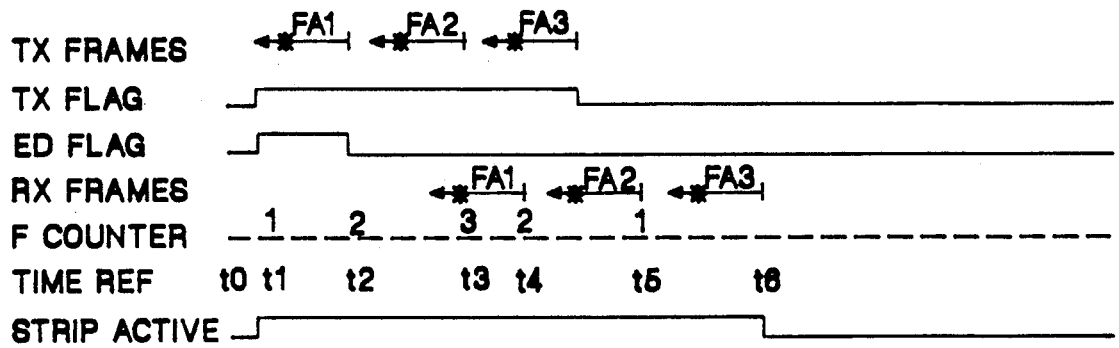
Figure 4:
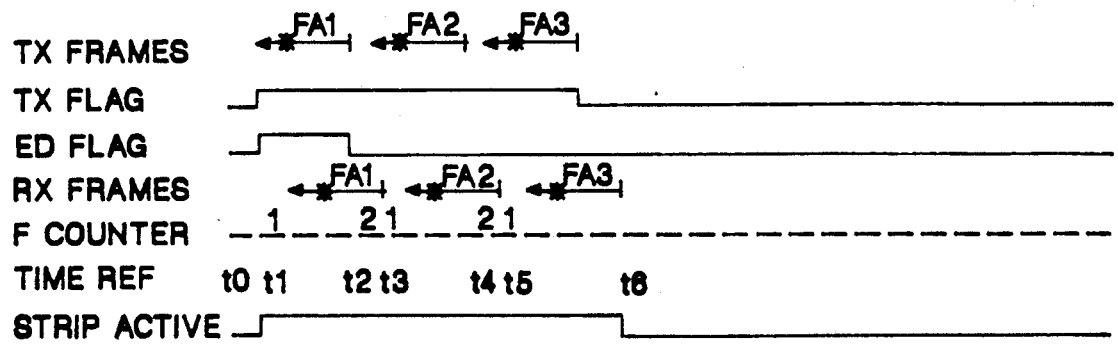

FIGS. 4A-C illustrate normal multi-frame stripping scenarios based on a large, medium and small ring respectively. The basic assumption made in the scenarios is that the ring is noise and error free (i.e., no data corruptions). In each scenario, three frames designated FA1, FA2 and FA3 are placed on the ring by a source station. Once the transmit operation starts, the transmit frame flag (TX_F) is set to 1 at the first starting delimiter in the transmit sequence, and reset to 0 at the last ending delimiter. The TX_F indicates to the strip finite state machine (STRIPFSM) that the transmit operation is on when it is set to 1. The end delimiter flag (ED₁F) is set to 1 at the starting delimiter of frame FA1 and reset to 0 at the ending delimiter of frame FA1. Setting the ED_F to 1 indicates to the STRIPFSM that the first ending delimiter of the multiple frame transmit sequence has not been sent yet. In other words, if the source station receives any ending delimiter while the flag is set to 1, it should be ignored since it did not originate at that station.

FIG. 4A depicts a large ring scenario in which the transmitted frames FA1, FA2 and FA3 return to the source station after it has completed its entire transmit sequence (i.e., when TX_F=0) due to the relatively large ring latency. A time trace of the changes in the frame counter is also shown in the figure. At time t0, the station is operating in repeat mode and has not yet started to transmit. The station acquires a usable token at time t1. The station's TXFSM exits the REPEAT MODE (state 0) and enters the TX FRAME state (state 1). The frame counter is set to 1. At time t2, the transmit station finishes sending the ending delimiter of the first frame FA1 and starts to send the first bit of the inter-frame gap (IFG). The frame counter is incremented from 1 to 2. Similarly, at time t3, the transmit station finishes sending the ending delimiter of the second frame FA2 and starts to send the first bit of the next inter-frame gap. The frame counter is incremented from 2 to 3. The receiver of the source station receives the ending delimiter of the first return frame FA1 at time t4. The frame counter is decremented from 3 to 2 indicating that the receiver has just stripped the first returning frame. The frame counter is decremented from 2 to 1 at time t5, when the receiver of the source station receives the ending delimiter of FA2 indicating that the receiver has stripped the second returning frame. Finally, at time t6, the receiver of the source station receives the ending delimiter of the third returning frame FA3. Since the frame counter indicates that this is the last frame to be stripped (FC=1), the STRIPFSM terminates the strip process at the end of the frame status byte by setting the end strip flag (ES_F) to 1. This, in turn, causes the TXFSM to leave the transmit frame state and return to repeat mode.

In the medium size ring scenario illustrated in FIG. 4B, the transmitted frames FA1, FA2 and FA3 return to the source station in the middle of the transmit sequence (i.e., when TX_F=1) due to the relatively smaller ring latency. The sequence of events causing changes in the frame counter follows the same pattern shown in FIG. 4A.

The small ring scenario is depicted in FIG. 4C. The ring latency is at a minimum of three bytes and enables the header of the return frame FA1 to be received at the source station before it has completed sending the trailer of the same frame (i.e., when ED_F=1). The trace of the changes in the frame counter is shown in the figure and is described as follows. At time t0, the station is in REPEAT MODE, waiting to start the transmit process. The station acquires a usable token at time t1 and its TXFSM transitions from state 0 to state 1. The frame counter is set to 1. The transmit station finishes sending the ending delimiter of the first frame FA1 at time t2, and starts sending the first bit of the inter-frame gap. The frame counter is incremented from 1 to 2. The receiver of the source station receives the ending delimiter of the first return frame FA1 at time t3. The frame counter is decremented from 2 to 1 indicating that the first return frame has been stripped. The rationale for the procedure for incrementing and decrementing the frame counter is based on the operations in a short ring scenario. The frame counter is incremented at the first bit of the inter-frame qap (bit-0 time) to prevent it from being decremented by a station's receiver before it is first incremented in a short ring scenario. This is due to the fact that the IFG bit-0 time is only one byte after the ending delimiter of a frame is transmitted while the minimum ring latency is three bytes long. Thus, the ending delimiter would always return after this point even in the short ring scenario. Next, at time t4, the transmit station after sending the ending delimiter of the second frame FA2 is just starting to send the first bit of the inter-frame gap. The frame counter is incremented from 1 to 2. The receiver of the source station receives the ending delimiter of the second return frame FA2 at time t5. The frame counter is decremented from 2 to 1 indicating that the station has stripped the second return frame. Finally, at time t6, the receiver of the source station receives the ending delimiter of the third return frame FA3. The frame counter value of 1 combined with the I-bit value of 0 indicates that this is the last frame to be stripped. The STRIPFSM terminates the frame stripping process at the end of the return frame status byte.

The token ring scenarios illustrated in FIGS. 4A—C apply only to rings operating in a noise and error free environment. Actual error conditions in a worst case scenario may cause a ring to be over-stripped and end up in a non-recoverable state. To guard against this problem, a multi-frame stripping protocol is described below which will detect any noise or data corruption error conditions and adjust the frame stripping process to enable automatic recovery from these error conditions at the earliest possible time with minimum damage to data frames.

Figure 5:
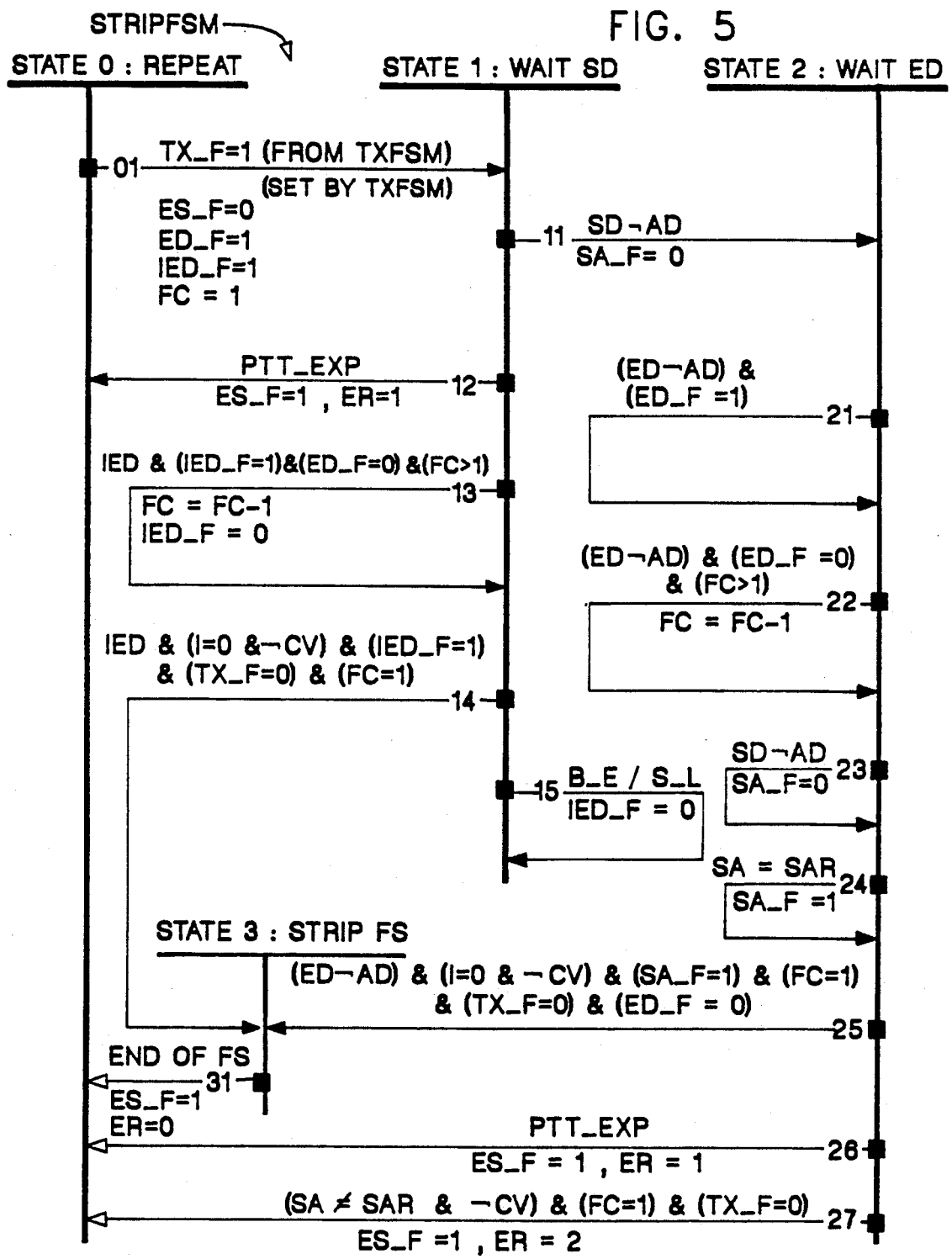
FIG. 5 illustrates the concept of the multi-frame stripping finite state machine (STRIPFSM) of this invention.

The multi-frame stripping protocol is characterized by a strip finite state machine (STRIPFSM) illustrated in FIG. 5. The STRIPFSM is applicable to both single frame and multi-frame stripping. The STRIPFSM works in concert with another finite state machine, called the isolated ending delimiter finite state machine (IEDFSM), to handle the frame stripping process under different error conditions. The four states shown are state 0-REPEAT, state 1-WAIT SD, state 2-WAIT ED, and state 3-STRIP FS.

From state 0, the only transition is transition 01 to state 1, where the STRIPFSM waits for a starting delimiter. This occurs when the transmit flag (TX_F) is set to 1 by the TXFSM, indicating that the transmit operation has started. The actions taken are to set the ending delimiter flag (ED_F), and the isolated delimiter flag (IED_F) to 1, and to set the end strip flag (ES_F) to 0. Setting the ES_F to 0 indicates that frame stripping is in progress. During this transaction, the frame counter (FC) is set to one by the TXFSM. The meaning of flag values is given in Table 1.

TABLE 1

| Finite State Machine Flags/Code | | | | |
|---|---|---|---|---|
| | | Value | | |
| Flag/Code | Description | 0 | 1 | 2 |
| ES_F | End Strip flag | Stripping in progress | Stripping terminated | |
| SA_F | Source Address flag | No source address match | Source address match | |
| TX_F | Transmit frame flag | Last frame sent | Last frame not sent | |
| ED_F | Ending delimiter flag | First ED transmitted | First ED not transmitted | |
| IED_F | Isolate ending delimiter flag | IED detect disabled | IED detect enabled | |
| IED | Isolated ending delimiter | IED not detected | IED detected | |
| ER | End return code | Strip normal end | Strip PTT expiration | Strip abort |
| I | Intermediate frame bit | Last frame | Intermediate frame | |

Five transitions can occur while in state 1. These translations are labeled 11, 12, 13, 14 and 15. Transition 11 causes an exit from the WAIT SD state to the WAIT ED state when the source receiver detects the starting delimiter of any returning frame. The source address flag (SA_F) is initialized to 0 on this transition. When a stripping station detects a PTT expiration, transition 12 represents an exit from the WAIT SD state to the RE-PEAT state. The end strip flag is set to 1 indicating that frame stripping has terminated and the end return code (ER) is set to 1 indicating that the PTT timer has expired.

Transition 13 is an exit from and return to state 1 which occurs when a frame stripping station detects an isolated ending delimiter while stripping an intermediate frame. The full set of conditions necessary for this transition to occur are that the isolated ending delimiter flag (IED_F) be set to 1 enabling IED detection. The ending delimiter flag (ED_F) be set to 0 implying that the first ending delimiter has been transmitted. The frame counter value is greater than 1. and an isolated ending delimiter is detected. An isolated ending delimiter is an ending delimiter that is not preceded by a corresponding starting delimiter. This transition can only occur during receipt of the first frame at the source station's receiver. The actions taken are to decrement the frame counter by 1 and to set the isolated ending delimiter flag (IED_F) to 0 to disable IED detection.

When the frame stripping station detects an isolated ending delimiter while stripping the only frame transmitted, transition 14 represents a transition from the WAIT_SD state to the STRIP FS state. The additional necessary conditions for the transition are that the transmit frame flag (TX_F) be set to 0 indicating that the single frame has been sent, the value of the frame counter is 1, the isolated ending delimiter flag is set to 1 indicating that IED detection has been enabled, the I-bit is set to 0, and no code violation errors have occurred. No action is taken on the transition.

In transition 15, a burst error (B_E) caused by noise or station insertions, or a signal loss (S_L) caused by data clocking errors causes an exit from and return to state 1. The action taken is to set the isolated ending delimiter flag to 0 to disable IED detection. This is to guard against noise being interpreted as being an ending delimiter.

The next set of transitions to be discussed are those which occur in the WAIT ED state. The first four of these transitions results in a station remaining in state 2. Transition 21 occurs when a source station's receiver detects an ending delimiter before the source station has transmitted the first ending delimiter (i.e., ED_F=1) in a multiple transmit frame sequence. In other words, an ending delimiter not sent by the source station has been detected. No actions are taken on this transition.

In transition 22, the source station receives an ending delimiter belonging to an intermediate frame and remains in state 2. The necessary conditions for this transition are the receipt of an ending delimiter without an immediately preceding starting delimiter, with the ending delimiter flag set to 0 indicating that the first ending delimiter has been transmitted, and with the value of the frame counter greater than 1. The only action taken is to decrement the frame counter by 1.

Transition 23 occurs when a starting delimiter is detected while in state 2. An ending delimiter must not immediately follow the starting delimiter. The action taken is to re-initialize the source address flag to 0. This transition is always followed by either transition 24 or transition 27 depending upon whether or not the source address of each received frame matches with the contents of the station's source address register. Transition 24 occurs when the source address from the received frame is the same as the contents of the station's source address register which is loaded by code. The action taken is to set the source address flag to 1 indicating a source address match.

Transition 25 is the normal strip terminating condition that results in an exit from state 2 to state 3 when the ending delimiter of the last frame is detected. The full set of necessary conditions are that an ending delimiter is detected that is not immediately preceded by a starting delimiter, the I-bit is set to 0 and no code violation errors have occurred, the frame counter is at 1, the source address flag (SA_F) is set to 1, the transmit frame flag (TX_F) is set to 0 indicating the last frame has been sent, and the ending delimiter flag (ED_F) is set to 0 indicating that the first ending delimiter has been transmitted. No action is taken on the transition. This transition represents the normal termination when the last frame in a multi-frame sequence is stripped.

Transition 26, like transition 12, occurs when the physical trailer timer (PTT) expires. In transition 26, the station exits state 2 of the STRIPFSM and enters state 0. The two actions taken are to set the end strip flag (ES_3F) to 1 indicating that frame stripping is terminated, and to set the end return code (ER) to 1 indicating that the PTT expiration was the reason for the frame strip termination.

In transition 27, the frame stripping station has detected a source address mismatch in the received frame with the frame counter set at 1 and with no code violation errors occurring during the receipt of the SFS of the return frame. This implies that frame stripping has progressed into a frame from another station on the ring. The full set of necessary conditions for this transition from state 2 back to state 0 are that a frame source address has been received that does not match the contents of the station's source address register, that no code violation errors have been detected in the SFS of the frame, that the transmit frame flag has been set to 0 indicating that the last frame has been sent, and that the frame counter is at 1. The two actions on the transition are to set the end strip flag (ES_F) to 1 and to set the end return code (ER) to 2 indicating that the reason for strip termination was a strip abort situation.

The final transition in the STRIPFSM is transition 31, which causes an exit from state 3 back to state 0. This transition occurs at the end of the returning frame status byte and completes the normal strip process. The only actions taken are to set the end strip flag to 1 and the end return code to 0 indicating normal frame strip termination.

Based upon the STRIPFSM transitions and with reference again to the noise and error free scenarios of FIGS. 4A-C, the sequence of transitions that will occur in stripping the three transmitted frames off the ring at the source station is as follows:

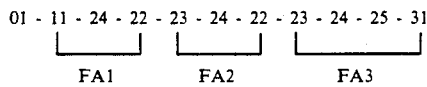

The sequence starts with transition 01 when the transmitter starts transmitting a multiple frame sequence. After the entire transmit sequence, the STRIPFSM remains in state 1 waiting to strip returning frames. Once the starting delimiter of the first returning frame FA1 is received, the STRIPFSM exits from state 1 to state 2 through transition 11. When the source address of FA1 is compared, the STRIPFSM goes through transition 24 to set the source address flag SA_F. When the ending delimiter of FA1 is received, the STRIPFSM goes through transition 22 to decrement the frame counter. The STRIPFSM goes through transition 23 when the starting delimiter of the second returning frame FA2 is received to received to reset the SA_F for FA2. The STRIPFSM then goes through transitions 24 and 22 for FA2 in the same way as was done for FA1. When the starting delimiter and source address of returning frame FA3 are received, the STRIPFSM goes through transitions 23 and 24 again. Receiving the ending delimiter of returning frame FA3, causes the STRIPFSM to go through transition 25 and enter state 3. The STRIPFSM stays in state 3 until the end of the frame status byte of FA3 is received at which time it exits on transition 31 and returns to state 0. During transition 31, the STRIPFSM sets the end strip flag (ES_F) to 1 signalling to the TXFSM that the stripping process has completed. This setting of the ES_F causes the TXFSM to return to repeat mode from transmit mode.

Figure 6:
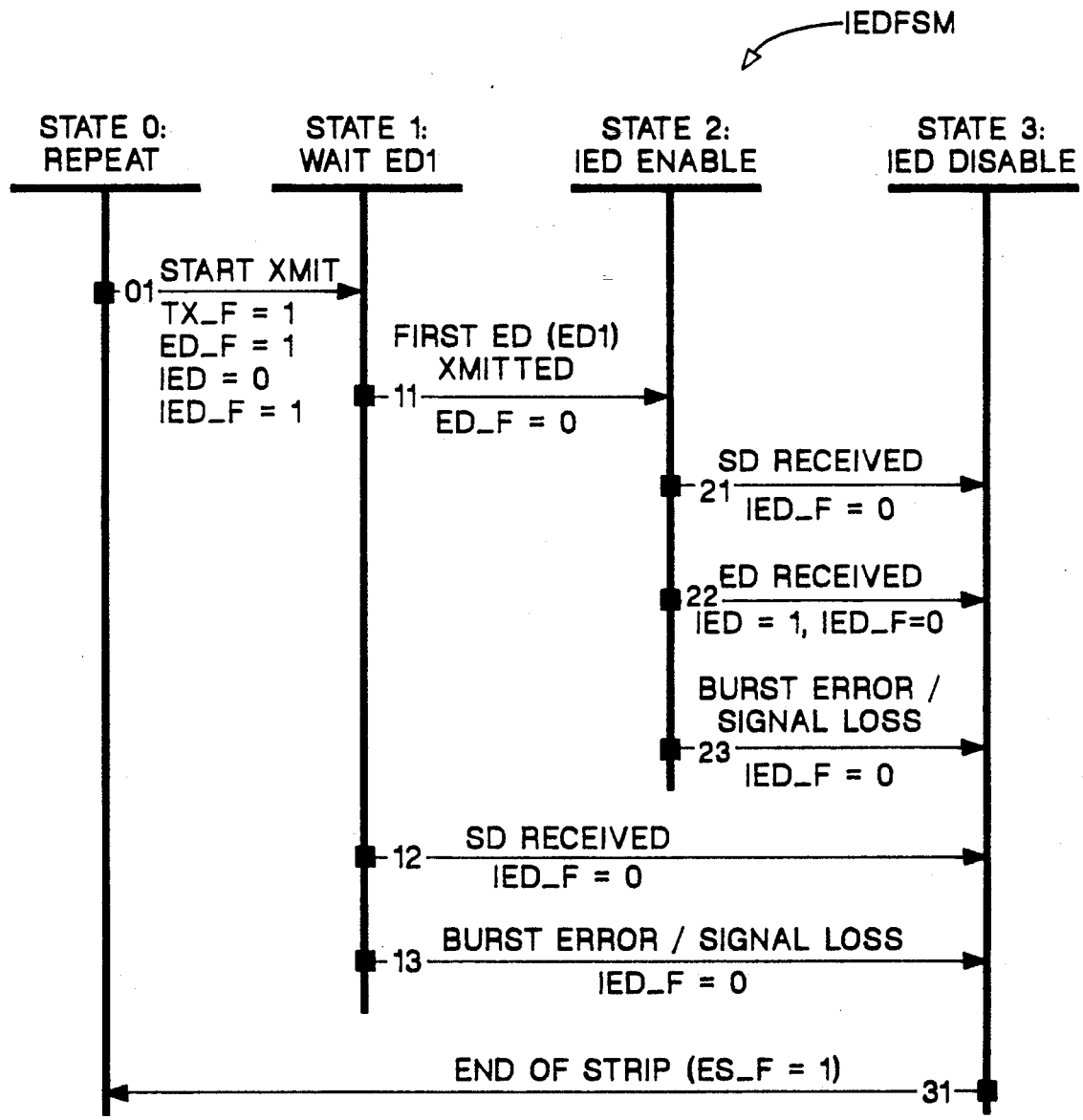
FIG. 6 illustrates the concept of the multi-frame stripping isolated ending delimiter detection finite state machine (IEDFSM) of this invention.

A third finite state machine closely related to the TXFSM and the STRIPFSM is the isolated ending delimiter finite state machine (IEDFSM) shown in FIG. 6. The IEDFSM manages the detection of the isolated ending delimiter and its function is integrated into the STRIPFSM. The IEDFSM has four states: state 0-REPEAT, state 1-WAIT ED1, state 2-IED ENABLE, and state 3-IED DISABLE.

The only transition while in state 0 is transition 01 to state 1-WAIT EDI. The transition occurs when the TXFSM start transmitting the first frame. The actions taken are to set the isolated ending delimiter flag (IED_F) to 1 enabling IED detection and setting IED detect to zero. Correspondingly, in the TXFSM, the transmit frame flag (TX_F) is set to 1 and the ending delimiter flag (ED_F) is set to 1 indicating that the first ending delimiter has not been transmitted.

Three possible transitions can occur while waiting for the first ending delimiter in state 1. Transition 11 causes an exit to state 2, the IED ENABLE state when the TXFSM transmits the ending delimiter of the first frame. The action taken is to set the ending delimiter flag to 0 indicating that the first ending delimiter has been transmitted. Transition 12 to state 3 occurs when the source station receives a starting delimiter while waiting for the ending delimiter of the first frame. Likewise, transition 13 to state 3 occurs when the source station detects a burst error or signal loss while in state 1. The action taken in both transitions 12 and 13 is to set the isolated ending delimiter flag to 0, thereby disabling IED detection.

State 2 is the IED ENABLE state and three transitions can occur while in this state, all of which result in going to the IED DISABLE state (state 3). Transition 21 occurs when the source station receives a starting delimiter while in state 2. The only action taken is to set the isolated ending delimiter flag to 0. Transition 22 occurs when the source station receives an ending delimiter while in state 2 (the IED ENABLE state). The actions taken are to set the IED detect (IED) to 1 indicating that an isolated ending delimiter has been detected, and to set the isolated ending delimiter flag to 0 disabling further IED detection. Transition 23 occurs when a source station detects a burst error or signal loss while in state 2. The action taken is to set the isolated ending delimiter flag to 0 disabling IED detection.

Finally, transition 31 causes the IEDFSM to exit from state 3, the IED DISABLE state, and return back to state 0 at the end of the frame stripping process. The condition triggering this transition is the end strip flag (ES_F) being set to 1 by the STRIPFSM. No action is taken on this transition.

Figure 7:
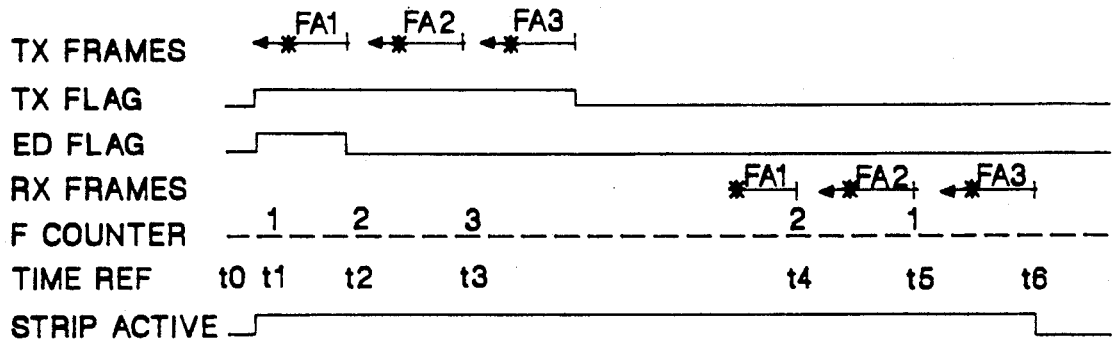
FIGS. 7A-7C illustrate several multi-frame stripping scenarios wherein a frame's starting delimiter has been corrupted.
Figure 7:
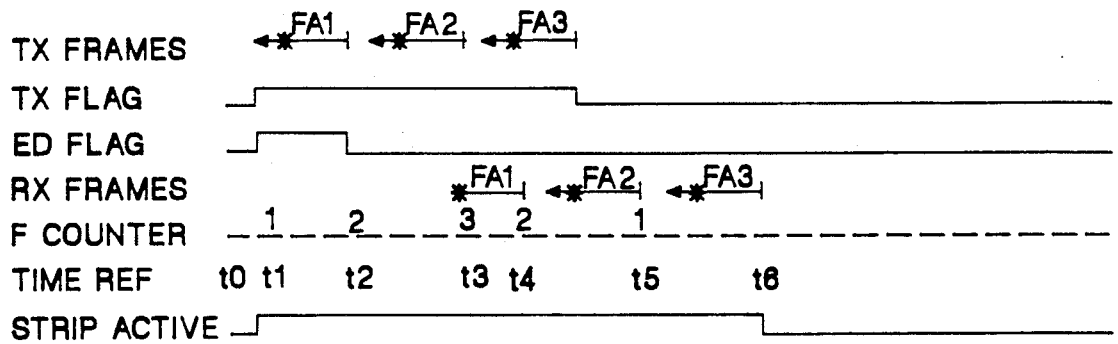
Figure 7:
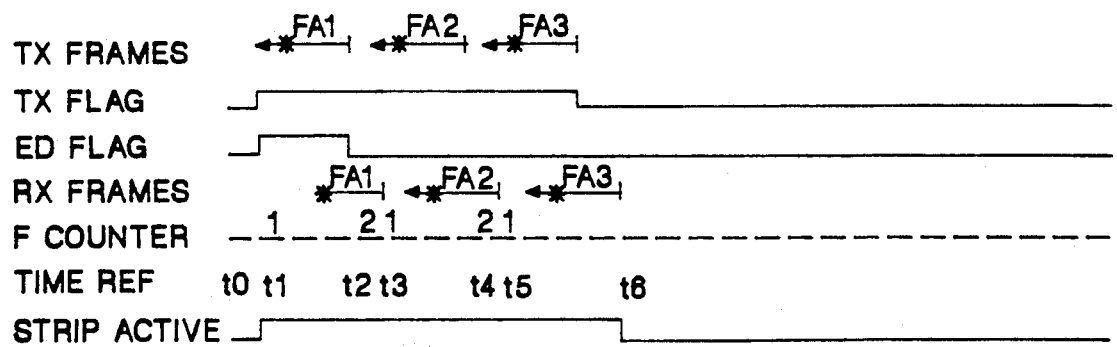
Figure 8:
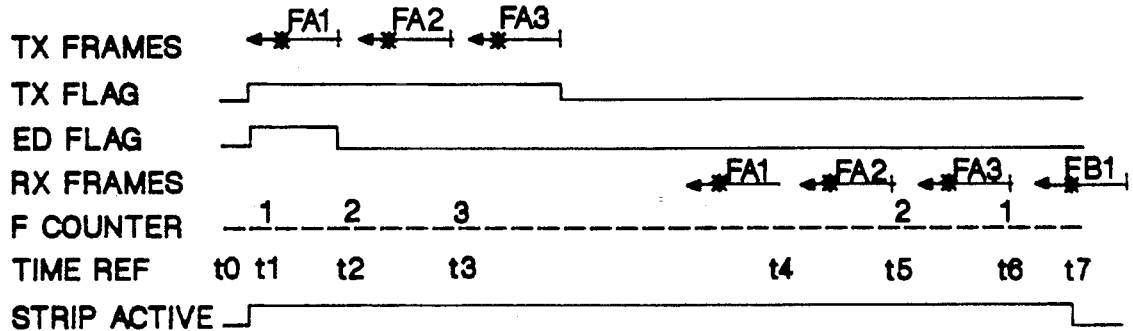
FIGS. 8A-8C illustrate several multi-frame stripping scenarios wherein a frame's ending delimiter has been corrupted.
Figure 8:
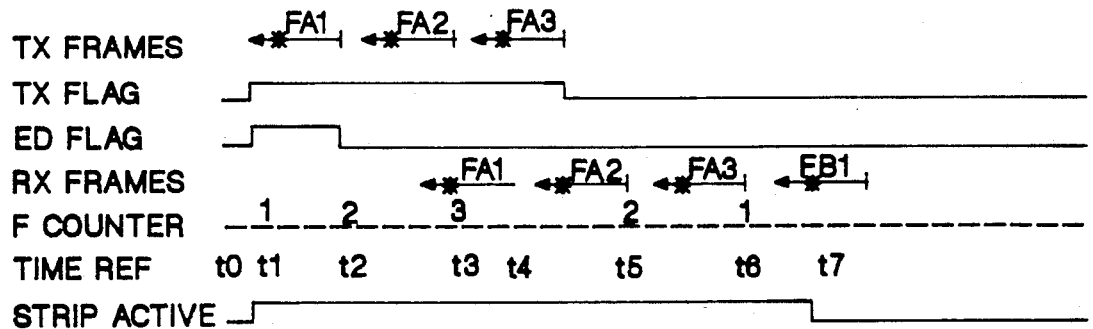
Figure 8:
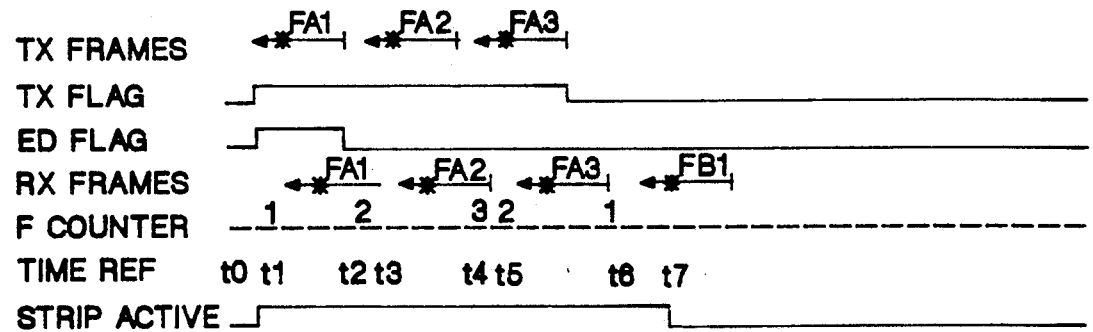
Figure 9:
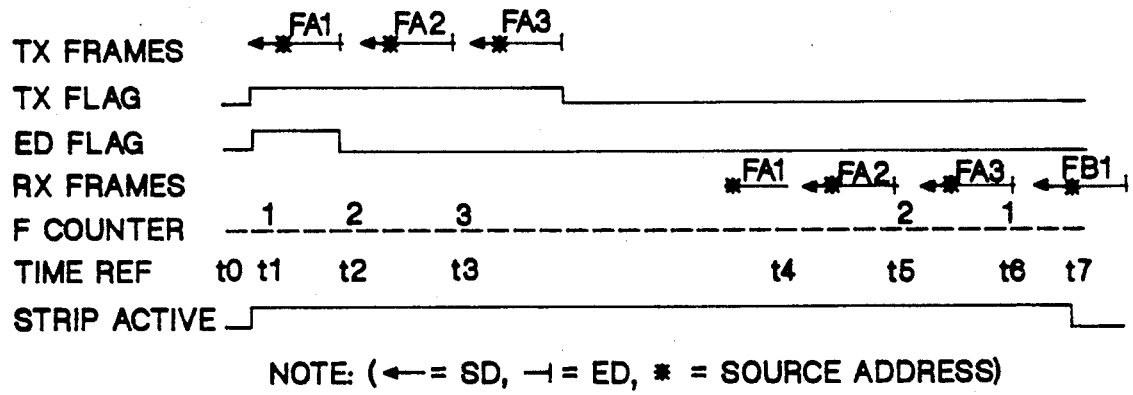
FIGS. 9A-9C illustrate several multi-frame stripping scenarios wherein both a frame's starting delimiter and ending delimiter have been corrupted.
Figure 9:
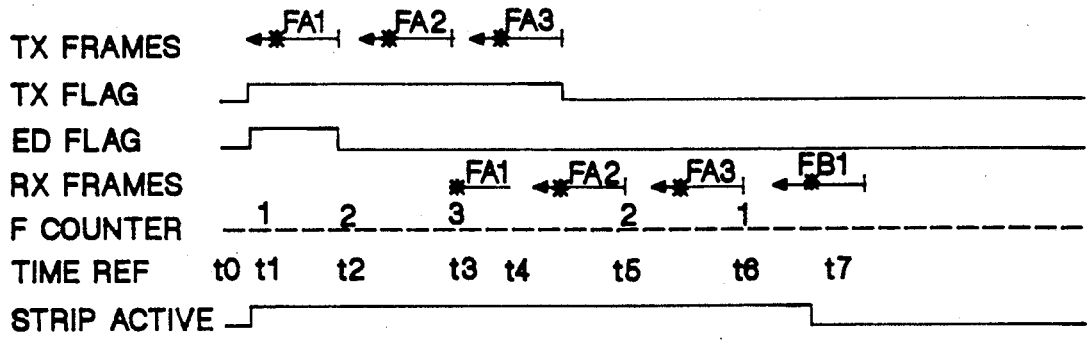
Figure 9:
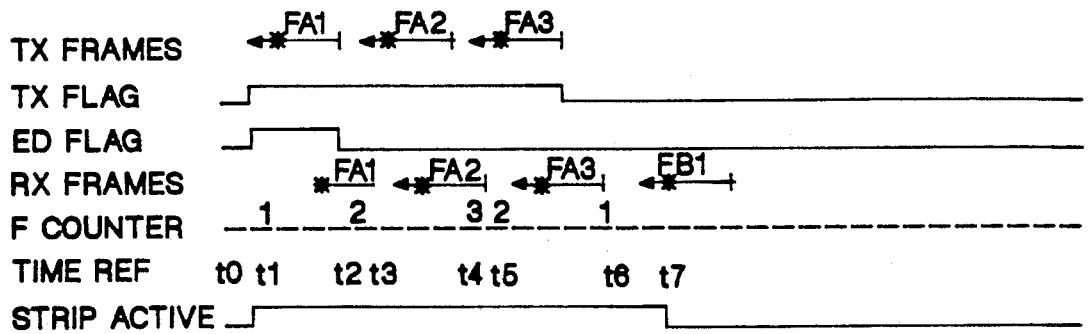

Based on the stripping algorithm described in the STRIPFSM, a stripping station can adapt to different strip error conditions and recover from the stripping process with a minimum loss of good data. In order to describe the operation of the frame stripping protocol, three simple error scenarios are illustrated in FIGS. 7, 8 and 9. The scenario in FIG. 7 depicts an error condition in which the starting delimiter of the first returning frame is corrupted. The sequence of transitions traced by the STRIPFSM is as follows:

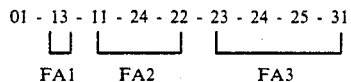

Even with a corrupted header in the first returning frame, the stripping station is able to terminate its strip operation at the right time without damaging the frames of any other station. The sequence starts with transition 01 when the transmitter starts transmitting a multiple frame sequence. The STRIPFSM remains in state 1 waiting to strip returning frames. When the ending delimiter of the first frame FA1 is received without detecting the corresponding starting delimiter, the STRIPFSM goes through transition 13 representing the detection of an isolated ending delimiter and remains in state 1. Once the starting delimiter of the second frame FA2 is received, the STRIPFSM exits from state 1 to state 2 through transition 11. Comparing the source address of FA2 with the contents of the source address register causes transition 24 with the source address flag (SA_F) being set to 1. Receiving the ending delimiter frame of FA2 results in transition 22 with the frame counter being decremented. When the starting delimiter of the third frame FA3 is received, the STRIPFSM goes through transition 23 and resets the source address flag. The source address of FA3 is compared with the source address register resulting in transition 24 with the source address flag being set to 1. Receiving the ending delimiter of FA3 results in transition 25 with the STRIPFSM entering state 3. When the frame status byte of FA3 is received, the STRIPFSM goes through transition 31 back to state 0.

In FIG. 8, an error condition occurs when the ending delimiter of the first returning frame FA1 is corrupted. The sequence of transitions undergone by the STRIPFSM is as follows:

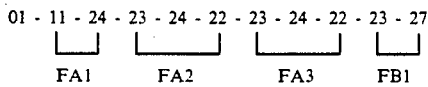

The sequence starts with transition 01 followed by transition 11 to state 2 upon receiving the starting delimiter of the first returning frame FA1. The source address comparison is then made resulting in transition 24. However, since the ending delimiter of FA1 is corrupted, transition 22 does not occur and thus the frame counter does not get decremented. The next two frames FA2 and FA3 are stripped with the STRIPFSM going through the usual transitions (23 - 24 - 22) for intermediate frames with the frame counter being decremented from 2 to 1 upon the receipt of the ending delimiter for FA3. Thus, the station will begin to strip the starting delimiter of FB1 from another station (transition 23). Since the source address of FB1 does not match the contents of the source address register, transition 27 occurs to stop the stripping immediately and return the STRIPFSM to the repeat state.

This scenario has illustrated that with a corrupted trailer in the first returning frame, the stripping station (station A) terminates its stripping operation when it sees the source address of the first frame FB1 sent by another station (station B). In this case, the stripping station has overstripped one frame header. However, the other station will see its returning frame sequence exactly as illustrated in FIG. 5 for a corrupted starting delimiter in the first returning frame. The overall result is that station B terminates its stripping at the same time as a normal termination. In summary, if this error condition occurs, the strip recovery takes place in the second station instead of in the first station as in the previous scenario.

The scenario shown in FIG. 9 is for an error condition in which both the starting delimiter and ending delimiter of the first returning frame FA1 have been corrupted. The sequence of STRIPFSM transitions is as follows:

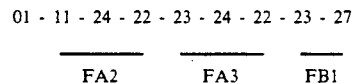

Again, the STRIPFSM starts with transition 01 to state 1, but then remains in state 1, stripping returning frame FA1 without any transition since both the starting delimiter and ending delimiter are corrupted. The STRIPFSM goes through the normal transitions for FA2 (11 - 24 - 22) which is regarded incorrectly as the first returning frame and for FA3 (23 - 24 - 22) which is regarded incorrectly as the second returning frame. The stripping station starts to strip frame FB1 from another station (transition 23) when the source address comparison detects a mismatch resulting in strip terminating transition 27 back to state 0.

As in the previous scenario, the stripping station terminates its stripping operation when it sees the source address of the frist frame sent by another station. The stripping station overstrips one frame header. The other station, however, sees its returning frame sequence exactly as in the scenario of FIG. 7 so that it terminates stripping at the right time. Strip recovery again takes place in the second station.

Figure 10:
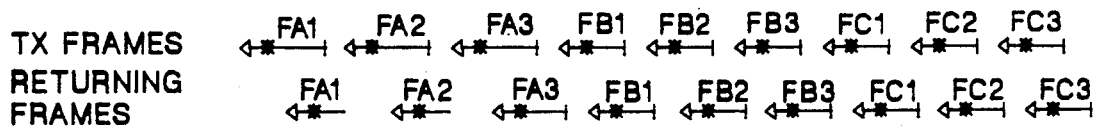
FIGS. 10A-10C illustrate a multi-frame stripping scenario in which the ending delimiters of the first two frames have been corrupted.
Figure 10:
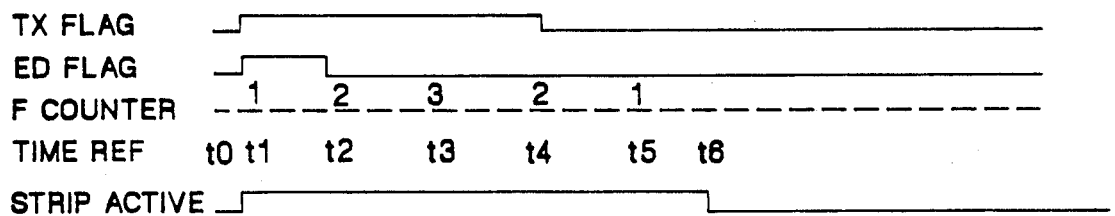
Figure 10:
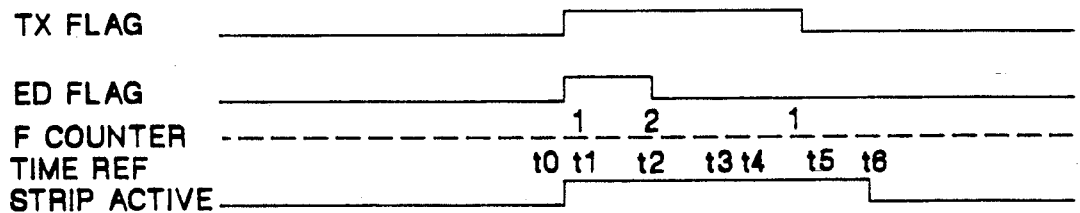
Figure 10:
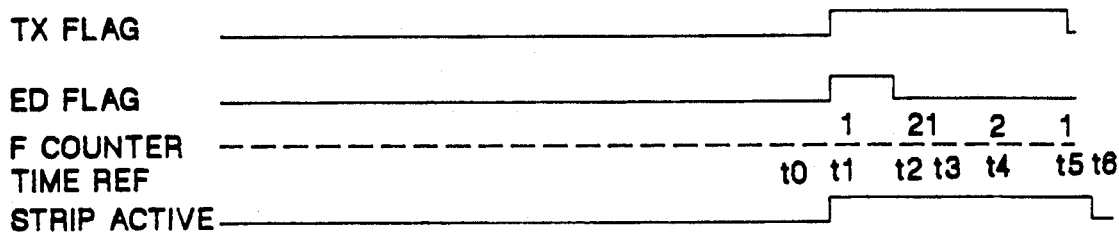

FIG. 10 illustrates an error condition in which both the ending delimiters of the first two returning frames FA1 and FA2 are corrupted either by ring error or by upstream overstripping. A chain reaction takes place leading to recovery from this error condition. The first stripping station (station A) in the ring overstrips two frames and leaves an isolated ending delimiter for the second stripping station. In FIG. 10A, station A stops its stripping operation at the source address field of frame FB2 and it leaves the ending delimiter of FB2 as an isolated ending delimiter for station B to detect.

The second stripping station (station B) in the ring overstrips one frame and leaves an isolated ending delimiter for the third stripping station. In FIG. 10B, station B stops its stripping operation at the source address field of frame FC1, leaving the ending delimiter of FC1 as an isolated ending delimiter for station C to detect.

The third stripping station (station C) in the ring stops its stripping operation at the normal time and the strip error condition is fully recovered. In FIG. 10C, station C counts the isolated ending delimiter left by upstream station B as its first stripped frame. It then continues its stripping process and finishes at the end of the frame status byte of frame FC3.

The sequence of STRIPFSM transitions for the three stations are similar to those described previously. Stations B and C experience the trace that applied to FIG. 7. Station A experiences a trace similar, but not identical to the one for FIG. 8. For example, transition 22 would not occur until the ending delimiter of FA3 was received. Furthermore, transition 23 would take place upon receiving the starting delimiter of FB1, but no transition occurs when the ending delimiter of FB1 is received, since the frame counter has not been decremented to one. Transitions 23 and 27 would occur upon detection of the starting delimiter and ending delimiter respectively of FB2.

While the invention has been particularly shown and described with reference to the particular embodiment thereof, it will be understood by those skilled in the art that various changes in form and details may be made therein without departing from the spirit and scope of the invention.

Having thus described our invention, what we claim and desire to secure as Letters Patent is as follows:

1. A method for recovering a token ring network having a plurality of stations when a corrupted frame from an originating station is present on the ring, wherein each station on the token ring network is capable of transmitting multiple frames onto the ring during a transmissible period and removing multiple frames from the ring, with each frame transmitted onto the ring having a starting delimiter, a source address field, an information field and an ending delimiter, and with an interframe gap following each frame transmitted, said method comprising the steps of:
    transmitting a first plurality of frames onto the ring at the originating station during the transmission period;
    releasing a token at said originating station after transmitting the last frame in the first plurality of frames to enable frame transmission in succession at downstream stations;
    transmitting an additional plurality of frames onto the ring at the downstream stations during additional transmission periods;
    receiving and removing the frames including said corrupted frame from said first plurality of frames and said additional plurality of frames at said originating station;
    monitoring the number of frames in said first plurality of frames transmitted onto the ring and the number of frames from said first plurality of frames and said additional plurality of frames removed at said originating station to limit the total amount of frames removed; and
    terminating the removal of frames at said originating station when a strip termination condition for corrupted frames has been detected.

2. The method of claim 1 wherein the step of monitoring the number of frames transmitted and removed includes:
    resetting a frame counter at the originating station to an initial value;
    incrementing the frame counter at the originating station after transmitting each frame, before the last frame in the first plurality of frames is transmitted; and
    decrementing said frame counter after removing each frame in said first plurality and said additional plurality satisfying a predetermined criterion until said frame counter is decremented to the initial value.

3. The method of claim 2 wherein a first predetermined criterion for decrementing said frame counter at the originating station is the detection of an isolated ending delimiter in the first frame received at the originating station.

4. The method of claim 2 wherein a second predetermined criterion for decrementing said frame counter at the originating station is the detection of each ending delimiter in said removed frames that is not immediately preceded by a station delimiter.

5. The method of claim 2 wherein the step of incrementing the frame counter is performed during the transmission of the first bit of said inter-frame gap following each from transmitted.

6. The method of claim 2 wherein the step of resetting said frame counter is performed following transmission of the starting delimiter in the first frame of said first plurality of frames.

7. The method of claim 1 wherein the step of receiving and removing frames includes the additional steps of:
    storing the source address of each frame in said first plurality of frames in a source address register at the originating station when each frame of said first plurality of frames is transmitted onto the ring;
    comparing the source address of the received frames at the originating station with the address stored in the source address register; and
    determining if any code violation errors have occurred in the part of each frame preceding the information field.

8. The method of claim 1 wherein the step of transmitting a first plurality of frames onto the ring includes:
    setting a transmit flag stored in microcode at the originating station when the first frame in said first plurality of frames is transmitted onto the ring;
    enabling the detection of an isolated ending delimiter in the frames received at said originating station;
    setting the intermediate frame bit to one in the ending delimiter of each transmitted frame preceding the last frame in said first plurality of frames;
    setting the intermediate frame bit to zero in the ending delimiter of said last frame in said first plurality of frames;
    resetting the transmit frame flange after transmitting the last frame in said first plurality of frames onto the ring; and
    starting a physical trailer timer at the originating station after releasing the token.

9. The method of claim 8 further including disabling the detection of the isolated ending delimiter when a starting delimiter is detected in the frames received at said originating station.

10. The method of claim 8 further including disabling the detection of the isolated ending delimiter when an ending delimiter is detected in the frames received at said originating station following the transmission onto the ring of the ending delimiter in the first frame of said first plurality of frames.

11. The method of claim 8 further including disabling the detection of the isolated ending delimiter when a burst error condition or a signal loss condition is detected in the frames received at said originating station.

12. The method of claim 8 wherein a first strip termination condition for corrupted frames is the receipt at the originating station of a frame in which the source address of the frame is not the same as the address stored in the source address register, no code violation errors have been detected in the part of said frame preceding the information field, the transmit frame flag has been reset, and the value in the frame counter is the same as the initial value.

13. The method of claim 8 wherein a second strip termination condition for corrupted frames is the detection at the originating station of an isolated ending delimiter when said first plurality of frames transmitted onto the ring at the originating station contains only a single frame and said single frame is received at the originating station.

14. The method of claim 8 wherein a third strip termination condition for corrupted frames is the detection of the ending delimiter in the last received frame of said first plurality of frames after having detected the ending,. delimiter in each preceding frame in said first plurality of frames, with the value in the frame counter decremented to the initial value, with the transmit frame flag reset, and with no code violation errors detected in the part of said last received frame preceding the information field.

15. The method of claim 8 wherein a fourth strip termination condition for corrupted frames is the expiration of the physical trailer timer at the originating station.

16. The method of claim 7 further including retaining the initial value in said frame counter if the ending delimiter of a frame transmitted by another station is detected following the detection at the originating station of the starting delimiter of the first frame in said first plurality of frames but preceding the transmission onto the ring of the ending delimiter of said first frame.

17. A system for recovering a token ring network having a plurality of stations when a corrupted frame from an originating station is present on the ring, wherein each station on the token ring network is capable of transmitting multiple frames onto the ring during a transmission period and removing multiple received frames from the ring, with each frame transmitted onto the ring having a starting delimiter, a source address field, an information field, and an ending delimiter field, and with an inter-frame gap following each frame transmitted, said system comprising:
means for transmitting a first plurality of frames onto the ring at the originating station during the transmission period;
means for releasing a token onto the ring at said originating station after transmitting the last frame in said first plurality of frames;
means for transmitting an additional plurality of frames onto the ring at a downstream station after acquiring the token;
means for receiving and removing frames including said corrupted frame from said first plurality of frames and from said additional plurality of frames at said originating station;
means for monitoring the number of frames in said first plurality of frames transmitted onto the ring and the number of frames from said first plurality of frames and said additional plurality of frames removed at said originating station to limit the total number of frames removed;
means for detecting a strip termination condition for corrupted frames at said originating station; and
means for terminating the removing of frames that is responsive to the detecting of the strip termination condition.

18. The system of claim 17 including counter means at said originating station for tracking the number of frames in said first plurality of frames transmitted onto the ring and the number of frames removed at said originating station.

19. The system of claim 17 including means for determining if an ending delimiter of a frame has been received without a corresponding preceding station delimiter.

20. The system of claim 17 further including:
register means at said originating station for storing the source address of each frame in said first plurality of frames transmitted onto the ring at said originating station; and
comparator means at said originating station for comparing the source address in the frames received at said originating station with the contents of said register means.

21. The system of claim 17 including means for determining if a code violation error has occurred in the part of each frame preceding the information field when each frame is received at the originating station.

22. The system of claim 21 including timer means for limiting the amount of time that the originating station can remove received frames from said first plurality of frames and said additional plurality of frames in the absence of the detection of any other strip termination condition.

23. An apparatus for recovering a token ring network having a plurality of stations when a corrupted frame from an originating station is present on the ring, wherein each station on the token ring network is capable of transmitting multiple frames onto the ring during a transmission period in an initial encoding format and removing multiple received frames from the ring, with each frame transmitted onto the ring having a starting delimiter, a source address field, an information field, and an ending delimiter, and with an inter-frame gap following each frame transmitted, said apparatus comprising:
register means for storing the source address of each frame transmitted at the originating station;
comparator means for comparing the contents of said register means with the source address of each frame received at the originating station;
counter means for monitoring the number of frames transmitted during said transmission period and subsequently removed at the originating station to limit the total number of frames removed;
frame transmit finite state machine means for controlling the transmission of multiple frames onto the ring at the originating station during said transmission period;
error detector means at said originating station for detecting the occurrence of an error condition on the ring;
isolated ending delimiter detection finite state machine means for detecting an isolated ending delimiter in the frames received at the originating station; and multi-frame strip finite state machine means cooperative with said comparator means, said counter means, said error detector means, said isolated ending delimiter detection finite state machine means and said frame transmit finite state machine means for initiating the removal of received frames from the ring, detecting the occurrences of a strip termination condition for corrupted frames, and terminating the removal of frames upon detection of a strip termination condition.

24. The apparatus of claim 23 wherein said error detector means includes:

starting delimiter detector means for detecting a starting delimiter in each received frame;

ending delimiter detector means for detecting an ending delimiter in each received frame;

code violation error detector means for detecting code violation errors in the part of each received frame preceding the information field;

corrupted token detector means for detecting a corrupted token;

abort delimiter detector means for detecting an abort delimiter sequence in each received frame; and burst error detector means for detecting a burst error or signal loss in each received frame.

25. The apparatus of claim 23 further including timer means cooperative with said multi-frame strip finite state machine means for limiting the duration of time that said originating station removes received frames from the ring.

* * * * *